INVENTORS.
James F. Grutsch
Russell C. Mallatt
BY Arthur E. Klaegel
ATTORNEY

United States Patent Office 3,692,473
Patented Sept. 19, 1972

3,692,473
METHOD AND APPARATUS FOR REGENERATING SPENT CAUSTIC CRESYLATE SOLUTIONS
James F. Grutsch, Hammond, and Russell C. Mallatt, Crown Point, Ind., assignors to Standard Oil Company, Chicago, Ill.
Filed Apr. 26, 1971, Ser. No. 137,332
Int. Cl. C01d 1/20; C07c 37/22
U.S. Cl. 423—183       5 Claims

ABSTRACT OF THE DISCLOSURE

Disclosed is an apparatus and process for reclaiming sodium hydroxide and phenolics from spent caustic cresylate solutions utilizing a pair of fluid bed reactors in series.

BACKGROUND OF THE INVENTION

Figure 1:
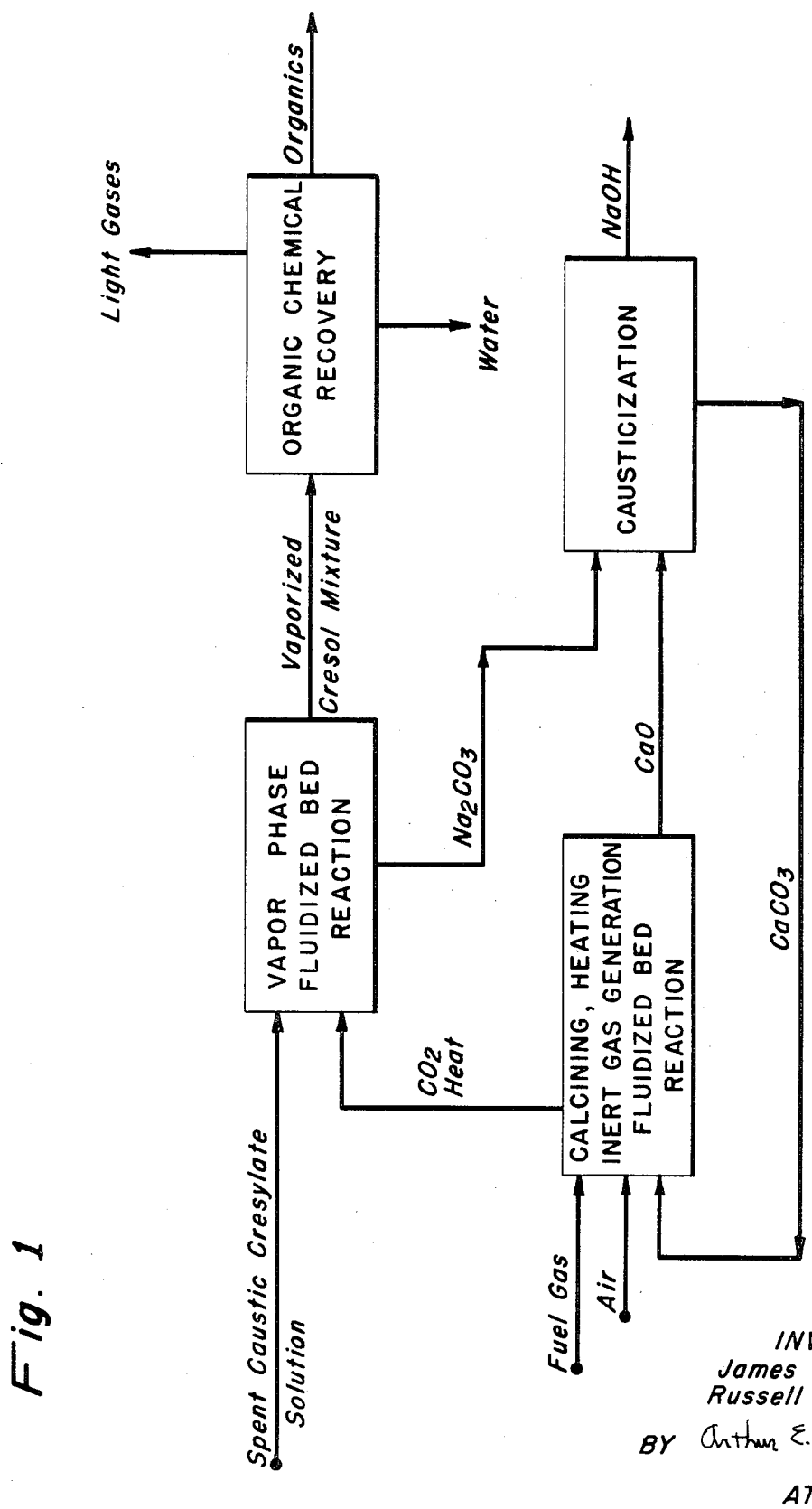

This invention relates to waste disposal. More particularly this invention relates to means whereby certain refinery waste materials are conveniently reprocessed into valuable products. Specifically this invention relates to a method and apparatus for recovering sodium hydroxide and phenolic compounds from spent caustic cresylate solutions. The phenolics are recovered as a solution of organic compounds containing phenolics and/or anilines.

Caustic solutions are used to wash refinery gases and products such as gasoline, kerosene and furnace oils. When spent, these solutions are referred to as "spent caustic cresylates" in the petroleum industry. These solutions contain varying quantities of sulfides, phenolates, naphthenates, sulfonates and mercaptides which had been extracted from the treated streams. Since these spent caustic solutions pollute water strongly, they should not be added to refinery effluent. The handling and disposition of spent caustics represents a continuing problem of increasing importance as nation-wide pollution abatement programs gain impetus.

Economic disposition of spent caustic cresylate solutions has not been fully resolved. The practice has been to neutralize the spent caustic solutions with acid in order to separate the phenolic acid oils, however high costs have led to gradual abandonment of this operation. Liquid phase processes where, for example, flue gas is contacted with the spent caustic are troublesome because of excessive salt deposition within the processing equipment. Currently most refiners simply pond their spent cresylate solutions or sell the solutions to concerns involved in the recovery of phenolics. There has been a very strong market for these spent solutions, but their value is diminished because:

(a) the solutions consist mainly of nonphenolic materials such as caustic, sulfur compounds, water, etc.,
(b) sulfur compounds interfere with present methods for recovering the phenolics,
(c) transportation costs are high, particularly for shipping weak solutions, thus precluding most refiners from making a profit on such sales, and
(d) processing of the spent solutions is not clean and creates pollution problems.

This invention, however, describes a new technique whereby the refiners can conveniently reprocess the spent caustic cresylate solutions at the refinery with a low capital investment cost and thus avoid transporting unprofitable materials while at the same time avoiding pollution problems.

SUMMARY OF THE INVENTION

Basically, this invention involves three common chemical reactions. In describing the applicable chemistry it will be assumed that the waste material is sodium phenolate, but it should be understood that a variety of other caustic phenolates such as those derived from xylenols, cresols and other low boiling phenolics can be processed equally well. As a practical matter the spent caustic cresylate solutions normally comprise a mixture of these compounds. The three chemical reactions generally involved are:

1. $$CaCO_3 \xrightarrow{heat} CaO + CO_2$$
2. $$2C_6H_5ONa + CO_2 + H_2O \xrightarrow{heat} 2C_6H_5OH + Na_2CO_3$$
3. $$Na_2CO_3 + CaO + H_2O \longrightarrow CaCO_3 + 2NaOH$$

An analysis of the above shows that the net result of the reactions is an inter-reaction to form phenol and sodium hydroxide from sodium phenolate. In the first reaction, the calcium carbonate is calcined to form calcium oxide and carbon dioxide which may be used as reactants in the first two reactions. In the second reaction the spent caustic solution is neutralized in a stream of carbon dioxide, the phenolates hydrolyze, and the sodium component of the spent caustic is tied up as sodium carbonate. In the last reaction, free caustic is regenerated by the familiar causticization reaction whereby sodium carbonate reacts with calcium oxide and water to form solid calcium carbonate and sodium hydroxide.

This invention involves accomplishing the aforesaid process chemistry in an integrated unit such that the main raw material supply is the spent caustic cresylate solution and the products are caustic and an organic solution. The organic solution may be a cresol solution containing phenols, cresols and other phenolic derivatives or, if ammonolysis is carried out as described below, anilines will also be present in the solution. Briefly, the invention involves calcining and heating calcium carbonate in a fluid bed reactor; sending the gaseous carbon dioxide formed in the first fluid reactor to a second fluid bed reactor in which spent sodium cresylates are reacted to form phenolics and depending upon the temperature in the second reactor, either sodium carbonate or bicarbonate; converting the vaporized cresol mixture formed to a cresol solution; reacting sodium carbonate obtained directly or indirectly from the second fluid bed reactor with the calcium oxide from the first fluid bed reactor in a recovery section; and recycling the calcium carbonate formed in the caustic recovery section to the first fluid bed reactor while recovering the sodium hydroxide formed in the caustic recovery section. If desired, the product cresol solution may then be separated into its phenolic components by known separation processes. Anilines may be produced by subjecting the reactants in the second reactor to ammonolysis and recovering an aniline solution instead of a cresol solution. This integrated fluid bed process provides a smooth continuous process and, by virtue of avoiding liquid phase reactions, avoids salt deposition problems encountered in the prior art processes.

BRIEF DESCRIPTION OF ACCOMPANYING DRAWINGS

Figure 2:
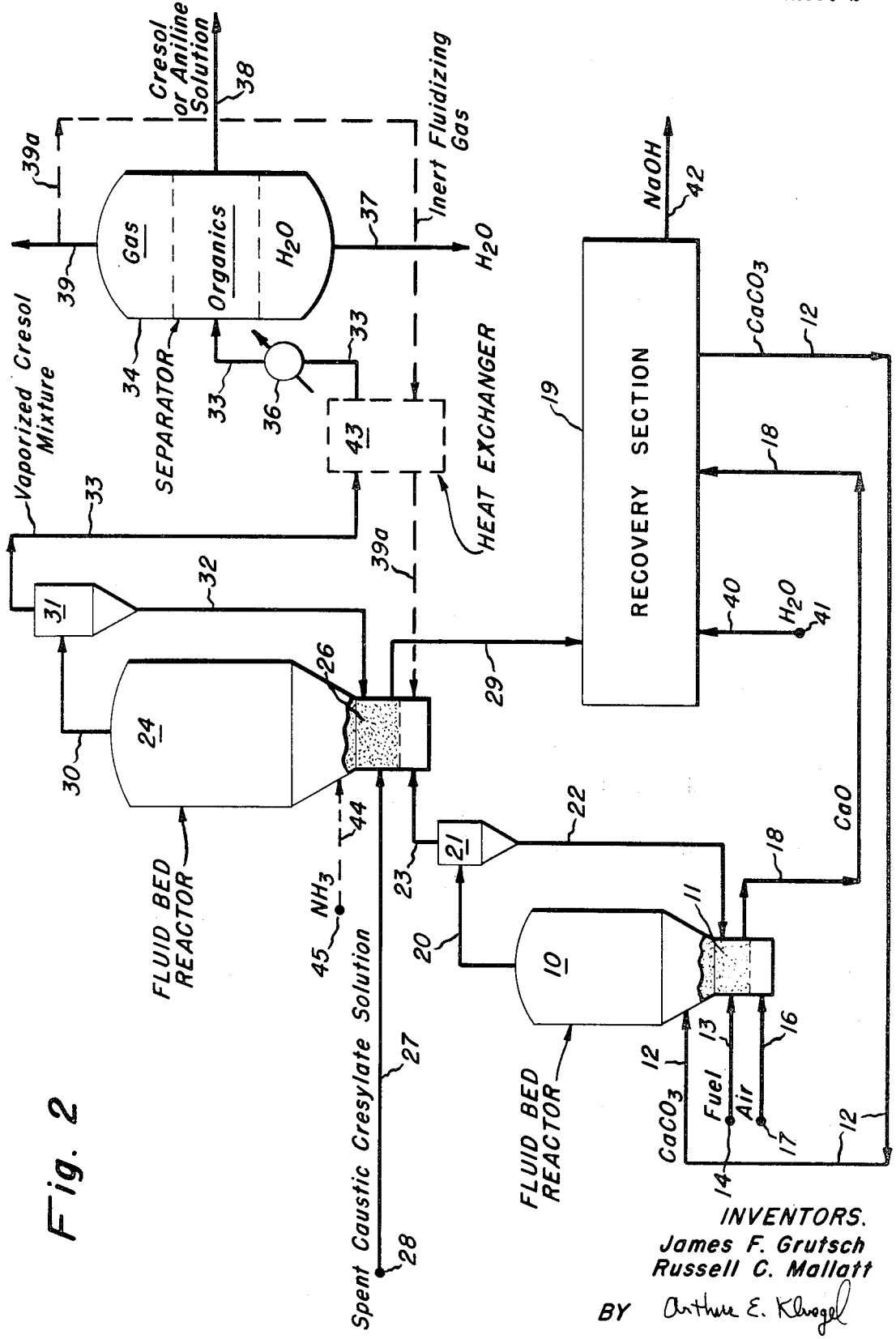

FIG. 1 is a simplified block diagram showing the three major reaction zones of the process.
FIG. 2 is a schematic process flow diagram showing how the fluid bed reactors are interconnected as part of the novel process.

DETAILED DESCRIPTION AND SPECIFIC EMBODIMENTS

In accordance with the present invention there is provided an improved process and apparatus for recovering sodium hydroxide and phenolic compounds from spent caustic cresylate solutions.

One embodiment of the process is depicted in the block diagram of FIG. 1. Solid calcium carbonate, air, and fuel are continuously fed to a first reactor. The fuel and air provide heat to decompose the calcium carbonate to calcium oxide and carbon dioxide and the fuel/air ratio is controlled so as not to support combustion in the second reactor. Since the product calcium oxide is produced in the form of small uniform spheres, it is readily maintained in the form of a fluidized bed by locating the air and fuel inlets in the lower portion of the reactor. Calcium oxide is continuously withdrawn from the reactor fluidized bed to maintain the bed at the desired level and is fed to a recovery section described later. A hot gaseous stream comprising carbon dioxide and inert combustion gases is withdrawn as the reactor overhead and fed to the lower portion of a second reactor. The heat from these gases is sufficient to maintain the temperature in the second reactor at a temperature above about 518° F. Spent caustic cresylate is fed continuously into the second reactor, and, as the sodium phenolates and phenolate derivatives contact the carbon dioxide, solid sodium carbonate is formed. The rising hot gases from the first reactor maintain the sodium carbonate in the form of a fluidized bed and at the same time vaporize the cresol mixture formed and carry it overhead. Sodium carbonate is continuously withdrawn from the fluidized bed to maintain the bed at the desired level and the sodium carbonate is fed to the recovery section. The overhead gas stream or vaporized cresol mixture from the second reactor is then subjected to a separation operation to effect a primary separation of the organic phenols and phenol derivative from the water and light gases. Typically this separation is carried out by condensing the vapor and decanting the immiscible organic and aqueous layers. Sodium hydroxide is continuously recovered in the recovery section. The recovery section may include any known equipment and method for carrying out the causticization reaction. Typical methods and equipment are disclosed in Kirk-Othmer, Encyclopedia of Chemical Technology, 2nd ed., vol. 1, pages 743–748, John Wiley and Sons, Inc. (1963). Such a reaction generally requires a feed of calcium oxide, water, and either sodium carbonate or bicarbonate. These components react to form solid calcium carbonate and sodium hydroxide. In the present invention, the calcium carbonate thus formed is recycled to the first reactor feed stream and the recovered sodium hydroxide is withdrawn.

In another embodiment of the process, the temperature in the second reactor is maintained below about 518° F. Under such conditions the sodium compound formed will be the bicarbonate rather than the carbonate. Although the bicarbonate can be causticized in the same manner as the carbonate, it is generally desirable to first subject the bicarbonate produced to temperatures above about 518° F. in order to decompose the sodium bicarbonate to sodium carbonate. Such a step reduces the amount of calcium oxide required in the causticization reaction in the recovery section.

In a third embodiment of the process, one may additionally inject a feed containing ammonia gas to the second reactor. An ammonolysis reaction within the second reactor will convert a portion of the phenolic compounds to amines such as aniline and toluidines. Instead of recovering a cresol solution one may then recover an aniline solution containing a variety of aromatic amines dependent upon the types of cresylates contained in the feed (spent caustic) stream.

In all of the preceding embodiments, the operation of the first reactor serves the following functions:

(1) supplying process heat via hot exhaust gases;
(2) calcining the calcium carbonate from the causticization reaction in the recovery section;
(3) providing carbon dioxide required in the second reactor; and
(4) providing inert gas needed in the second reactor.

Referring now to FIG. 2, fluid bed reactor 10 contains a fluidized bed 11 of calcium oxide. The reactor contains inlet line 12 for supplying a stream of calcium carbonate, inlet line 13 in the lower portion of the reactor and in communication with fuel source 14, and inlet line 16, also in the lower portion of the reactor, in communication with air source 17. Inlet lines 13 and 16 are located at or below the level of fluidized bed 11 in order to maintain the bed in a fluidized state. Outlet line 18 is located between the top and bottom of fluidized bed 11 and communicates with recovery section 19. Overhead line 20 communicates with cyclone 21 which in turn communicates both via line 22 with reactor 10 to return solid materials to the reactor and via line 23 with fluid bed reactor 24 to permit the gaseous stream to pass from cyclone 21 to reactor 24. Fuid bed reactor 24 contains a fluidized bed 26 of sodium carbonate or bicarbonate. This bed is maintained in a fluidized state via locating the inlet for line 23 in the lower portion of reactor 24 below the level of the fluidized bed 26. Reactor 24 communicates with inlet line 27 which is in turn in communication with a source of spent caustic cresylate solution 28. The heat provided by the gaseous stream admitted to the reactor via line 23 vaporizes the spent caustic cresylate solution while the carbon dioxide present in the gaseous stream reacts with the sodium component of the caustic cresylates to form either sodium carbonate or bicarbonate which becomes a part of bed 26. Outlet line 29 communicates with recovery section 19 and is located between the top and bottom of the fluidized bed 26. This line 29 supplies sodium carbonate or bicarbonate to the recovery section where sodium hydroxide is ultimately recovered. Overhead line 30 communicates with cyclone 31 which in turn communicates with the fluid bed portion of reactor 24 via line 32 to return solids to reactor 24. Cyclone 31 also communicates, via overhead outlet line 33, with separator 34 via condenser 36. Separator 34 contains two liquid phases and a gas phase. The aqueous liquid phase is continuously withdrawn via line 37. The organic liquid phase is continuously withdrawn as a cresylate solution via line 38. Light off gas is withdrawn from the separator 34 via overhead line 39. Recovery section 19 is in communication, via line 12, with reactor 10 whereby calcium carbonate formed in the recovery section is fed to reactor 10. Inlet line 40 in communication with water source 41 supplies water to recovery section 19. Outlet line 42 in communication with recovery section 19 withdraws sodium hydroxide from the system.

In one preferred embodiment of the above apparatus, outlet line 39 from separator 34 may be connected to the lower portion of reactor 24 via line 39a in order to recycle a portion or all of the inert light gases recovered in the separator to reactor 24. To conserve process heat, lines 33 and 39a may be passed through heat exchanger 43 in order to transfer heat from the vaporized cresylate mixture to the recycled inert gas. In another embodiment of this invention fluid bed reactor 24 may additionally contain an inlet line 44 in communication with a source of ammonia 45 in order to permit conversion of cresylates to anilines.

The operation of the second reactor serves the functions of hydrolyzing the phenolics contained in the spent caustic cresylates and converting the sodium compounds to solid carbonates or bicarbonates. In the third embodiment of this invention ammonolysis also takes place in the second reactor. The recovery section recovers sodium hydroxide by the reaction of the sodium carbonate or bicarbonate and the calcium oxide.

One may use any known method to recover the phenols or amines from the vaporized cresol mixture in which they are contained as they are withdrawn from the second reactor. The preferred method is to condense the vaporized material by cooling it to a temperature low enough to condense the water vapor and all of the organic materials sought to be recovered. Where the separation is to take place at atmospheric pressure, temperatures below about 212° F. are required. The condensate exists in two immiscible layers, an organic layer and an aqueous layer. The layers may then be separately decanted to effect the separation.

Although the decanted water will have a low organic content, the organic content may be further decreased by controlling the acidity of the aqueous layer and by the addition of a cutter stock, such as pentanes, which will extract the organics from the aqueous solvent. The cresol or aniline solution obtained by the above separation may be further separated into its organic components by known techniques such as fractional distillation. The light off gases may then be recycled to the lower portion of the second reactor to serve as an inert fluidizing gas.

Although it is not essential, it is desirable to heat exchange the hot vapors from the second reactor with the off gas from the condensed liquid separator to conserve process heat. The process of this invention may be combined with known treating processes such as sulfur removal. For example, one may first subject the spent stream to air oxidation followed by removal of the disulfides formed.

The use of the process and apparatus of the present invention results in substantial advantages for the user. The integrated apparatus and process flow minimizes separate handling. The use of fluidized beds gives rise to the following advantages:

(1) They provide for the accumulation and removal of the sodium compound from the process in a form easy to handle and readily regenerable to sodium hydroxide.
(2) They act as heat sinks allowing precise control of molecular oxygen in the gas stream from the first reactor and minimizing temperature upsets in the system.
(3) They are readily instrumented for automatic process control.
(4) They avoid the problems of conventional liquid phase reactions such as that of high salt buildup within the process equipment.
(5) The high degree of recovery and minimal salt formation avoids the problem of disposing of process water having excessive salt and organics content.

We claim:
1. A continuous integrated process for the recovery of an organic solution and sodium hydroxide from a spent caustic cresylate solution, comprising:
(A) converting a continuous feed of calcium carbonate to calcium oxide in a first reactor by a process comprising:
(1) passing a continuous feed of calcium carbonate into said first reactor;
(2) introducing fuel gas and air into the lower portion of said first reactor, whereby said first reactor is maintained at an elevated temperature, said calcium carbonate is continuously converted to calcium oxide and carbon dioxide, and whereby said calcium oxide is maintained in the form of a fluidized bed within said first reactor;
(3) continuously withdrawing calcium oxide in an amount sufficient to maintain said fluidized bed at a desired leved; and
(4) continuously withdrawing a gaseous stream comprising hot inert combustion gases including said carbon dioxide;
(B) converting a continuous feed of spent caustic cresylates to a vaporized organic mixture and sodium carbonate or bicarbonate in a second reactor by a process comprising:
(1) passing a continuous feed of spent caustic cresylates into said second reactor;
(2) feeding a hot gaseous stream into the lower portion of said second reactor, said stream comprising carbon dioxide gas generated by said first reactor, whereby a vaporized organic mixture and a solid sodium compound selected from the group consisting of the carbonate and bicarbonate and mixtures thereof is continuously produced and whereby said sodium compound is maintained in the form of a fluidized bed within said second reactor;
(3) continuously withdrawing said vaporized organic mixture from said second reactor;
(4) continuously withdrawing the sodium compound from said second reactor in an amount sufficient to maintain said fluidized bed at a desired level;
(C) continuously converting said vaporized organic mixture into a liquid organic solution by separating out water and light gases from said mixture;
(D) causticizing the withdrawn sodium compound from said second reactor in a recovery section by a process comprising:
(1) passing a continuous feed of said withdrawn sodium compound from said second reactor to said recovery section;
(2) passing a continuous feed of said withdrawn calcium oxide from said first reactor to said recovery section;
(3) passing water or water vapor to said recovery section, whereby solid calcium carbonate is continuously formed and whereby liquid sodium hydroxide is continuously recovered; and
(E) continuously recycling the solid calcium carbonate produced by said causticizing step to said first reactor.

2. A process as recited in claim 1 wherein the temperature in the second reactor is maintained below about 518° F. whereby the solid product is the bicarbonate of sodium, and the sodium bicarbonate produced is subjected to temperatures above about 518° F. prior to being fed to said causticization reaction whereby said sodium bicarbonate is decomposed to sodium carbonate.

3. A process as recited in claim 1 wherein the organic solution is separated from the vaporized organic mixture by the steps of:
(A) cooling said vaporized organic mixture to condense the organic materials, whereby an uncondensed light gas phase and immiscible liquid layers of organic and aqueous material are formed; and
(B) separately decanting said liquid layers to effect the separation of said organic solution.

4. A process as recited in claim 3 wherein the uncondensed light gas portion of the vaporized cresol mixture is recycled to the lower portion of said second reactor.

5. A process as recited in claim 1 wherein the feed to said second reactor also includes ammonia whereby phenols are converted to anilines and the product organic solution contains said anilines.

References Cited
UNITED STATES PATENTS

| | | | |
|---|---|---|---|
| 2,686,105 | 8/1954 | Dickey et al. | 23—63 |
| 2,815,389 | 12/1957 | Geller et al. | 260—627 R |
| 3,036,882 | 5/1962 | Bemmann et al. | 260—627 R |

OSCAR R. VERTIZ, Primary Examiner

G. V. ALVARO, Assistant Examiner

U.S. Cl. X.R.

423—189; 260—627 R